Jan. 16, 1945. E. H. COOPER 2,367,200
TOWEL CABINET
Filed Jan. 30, 1941 9 Sheets-Sheet 3

Fig. 7.

Inventor:
Earl H. Cooper,
By Joshua R. H. Potts
his Attorney.

Witnesses: C. E. Wessels
Clementine C. Deiro

Jan. 16, 1945.  E. H. COOPER  2,367,200
TOWEL CABINET
Filed Jan. 30, 1941  9 Sheets-Sheet 9

Inventor:
Earl H. Cooper,
By Joshua R. H. Potts
his Attorney.

Patented Jan. 16, 1945

2,367,200

UNITED STATES PATENT OFFICE

2,367,200
TOWEL CABINET

Earl H. Cooper, Toledo, Ohio, assignor to Jacques Rousso, Los Angeles, Calif.

Application January 30, 1941, Serial No. 376,575

7 Claims. (Cl. 312—38)

This invention relates to towel cabinets, and more particularly, for intermittently dispensing or paying out predetermined or desired lengths of clean toweling from a roll or a strip or web of cloth in rolled, folded or other form so as to depend from the mechanism in the form of a loop, strip or web and to simultaneously wind or take up the soiled toweling after use.

An object of the invention is to indicate to the user the inoperative period during which the towel may not be pulled out and to continuously indicate by a discernible, perceptible or audible signal the period between the time when the towel is pulled and moved to present a clean section of toweling for use and when it may be moved again to feed or advance another clean section of toweling, during which time the toweling may not be pulled out.

Another object of the invention is to provide means for locking the toweling against movement to prevent feeding or pulling thereof at timed intervals and for adjusting the time interval between feeding and release of the towel. After the towel has been pulled out or fed and during which time interval a person is wiping his hands, the towel is locked or held against movement, until the release thereof when the towel may again be pulled out. Heretofore, to prevent pulling out or feeding, it was possible to release the towel manually or otherwise and to successively pull out a number of lengths of toweling which was inducive to waste and since the interval of time may be set or adjusted with the present invention, say for 8 seconds or otherwise as desired, successive pulling out or advancing of the toweling is prevented as it is necessary to wait out the time interval before the toweling can again be pulled out, thereby avoiding waste and resulting in economical use of the towel.

Another object of the invention is to provide means to control the feeding of the towel so that in pulling a length of toweling the feeding or measuring roll is turned other than an integral number of revolutions, thereby assuring more than one stopping position so that the pinch roll will not engage the abrasive surface of the feeding roll at the same point after each feeding operation, thereby distributing the wear over the entire abrasive surface of the roll and insuring a longer useful life for said surface and positively feeding the towel and winding or taking up the soiled towel.

Another object of the invention is to provide a novel ratio of feeding, winding, timing and time release mechanism whereby the friction feeding and winding rollers are advanced more than one complete revolution each time a length of toweling is pulled down or out for use so as to cause the strip of toweling to engage different points on the surfaces of the feeding and winding rollers for every one of a multiple of operations or revolutions thereof, such as 5, thereby preventing undue wear at particular points on the friction surfaces of said rollers and increasing the useful life of said roller surfaces a multiple, i. e., five times their ordinary life.

Another object of the invention is to so arrange and support the toweling within the cabinet that practical maximum of contact areas or lengths of the toweling will be engaged with practical maximum of contact areas or peripheral surfaces of the feeding and winding or take-up rollers to also insure longer useful lives for said surfaces and more positive, uniform and even feeding and winding of the toweling.

Another object of the invention is to provide a novel mounting means for the cabinet and obviate the necessity of providing a stand or floor support, thereby releasing valuable floor space for use and obviating the possibility of the cabinet being tipped over.

Another object of the invention is to provide a novel towel cabinet which can be supported against a suitable vertical support such as a wall or board with the frame of the cabinet supporting the mechanism removable and the cover or cabinet proper hinged to its support preferably near the lower rear corner of the machine which enables it to swing forwardly and downwardly to serve as a container for holding the clean towel roll, towel guide, soiled towel rod or roller or any other articles which might otherwise be mislaid or difficult to manipulate during the loading of the machine, thereby keeping such parts readily accessible and facilitating the emptying and loading or removal of a soiled towel roll and positioning of a clean towel roll.

Another and important object of the invention is to provide a pinch roll which is contained in an assembly serving as a toweling guide and made separate from the rest of the mechanism thereby permitting the positioning of the pinch roll after the toweling has been placed in position and the clean toweling roll thrown in so as to make threading of the toweling unnecessary.

Another object of the invention is to place the pinch roll under spring tension so that no towel slippage is required to set the pinch roller firmly as compared with other machines which require motion of the toweling to accomplish this function.

Another object of the invention is to hold the soiled towel roll in contact with the winding or take-up roller by spring tension instead of depending upon gravity as in other machines so as to accommodate a wide variance in roll size and produce a more uniformly and tightly wound roll of soiled toweling, thus reducing the space requirement of the roll.

Another object of the invention is to provide a novel arrangement of rollers and toweling for feeding the clean toweling from a dispensing roller to a winding or receiving roller for the used or soiled towel and to separate the clean toweling supply or roll and soiled towel roll by a movable plate which compensates for the reduction in the size of the clean toweling supply or roll and the enlargement of the soiled towel roll.

Another object of the invention is to provide a floating roll separator which can automatically assume any position required by the changing sizes and positions of the clean toweling supply or roll and the soiled toweling to effect a conservation of space by utilizing the space given up by the diminishing clean toweling supply or roll to accommodate the increasing size of the soiled towel roll.

Another obect of the invention is to provide a bottom for the cabinet which also serves as a separator at the back to support or receive the pressure of the clean towel supply or roll and separate the used soiled toweling from the clean toweling in passing to the winding or take-up roller and in which said separator between the clean toweling supply or roll and the ascending soiled toweling can be swung clear of the back of the machine to provide ready access thereto, thus further simplifying the task of loading.

Another object of the invention is to provide a signal which is discernible or audible to the user to indicate continuously during a time interval when the feeding mechanism is locked and the toweling cannot be pulley out or the time between intermittent checking and releasing or feeding of lengths of toweling, when the towel can not be moved, so as to prevent pulling another length of towel until the same is released at the end of said time interval, and to obviate accidental or useless waste of and pulling on the towel when it cannot be moved and should not be pulled during the wiping operation or use of the towel.

Another object of the invention is to provide novel means for supporting and feeding a clean towel as well as winding up a soiled towel including a novel construction of rollers for maintaining the toweling under tension and insuring uniform, even and positive feeding and winding of the towel and which in addition to the above stated object of permitting the removal of the mechanism supporting frame, to permit quick and convenient removal and replacement of the friction rollers or cylinders of the feeding and winding rollers at the place of installation or use when the friction surfaces thereof have become worn without the necessity of taking the entire cabinet back to the shop or factory.

Another object of the invention is to provide a novel construction of friction or sand rollers wherein the webs or ends thereof are set into the ends of the body or cylinder of the roll thereby enabling the replacement of the worn sand surface by substitution of the body only and to provide separable bearing plates at the ends of each roll so that the removal and substitution can be effected without disassembling the machine.

Another object of the invention is to provide a novel construction of friction or sand roll employing a tie rod in the roller assembly which converts any transverse load on the sand roll hubs into a lineal stress on the tie rod and not on the web assembly alone so that if the roll should be under extreme abuse and something must give way, the resulting deformity will only be the stripping of the threads on the tie rod so that the hubs will not be broken even though loose and the machine will not be put out of service. The cost of this common type of repair is reduced to just a fraction of the usual cost or eliminated by this construction.

Still another object of the invention is to provide a timed lock mechanism which operates in such a manner that the time interval is measured from the instant the lock drops in to prevent feeding of the toweling regardless of whether the user releases his pulling tension of the toweling or not and at the end of this period will release the lock as soon as or whether or not the tension on the toweling is relaxed thereby overcoming the objections to other cabinets which are unable to operate their timers while the toweling is held in tension by a playful or unaccustomed user.

A still further object of the invention is to provide a timer which is discernible or audible during the timing period instead of merely indicating when the same is released so that inadvertent pulling on the towel previous to the release or during the time interval will be obviated continuously during the entire time interval when the toweling cannot be pulled out until the locking mechanism is released, thus serving as a warning for the ensuing period that the toweling may not be pulled out so as to save unnecessary abuse which normally arises from the fact that with most cabinets one can only determine the period of locking and the release thereof by trying to pull the toweling.

Further objects and advantages will appear and be brought out more fully in the following specification, reference being had to the accompanying drawings, in which.

Referring more particularly to the drawings in detail, 35 designates a vertical support such as a wall, board or plate mounted against or in a wall designed to support the cabinet thus obviating the necessity of employing a floor stand so that valuable floor space may be otherwise used. Secured to the vertical support 35 is a back mounting plate 36 preferably of metal having right angular or outstanding vertical or parallel side flanges 37 designed to removably support the frame or mechanism of the device. As shown, these side flanges are provided with a plurality of bayonet slots 38 opening at the top through the edges of the flanges to receive outstanding pins 39 projecting from the side plates 40 and 41 of the frame of the machine which supports the mechanism as a unit. If desired, three of such pins and bayonet slots may be provided, the pins 39 engaging the upper and lower slots and the intermediate slots being engaged by clamping screws 42 engaging threaded apertures in the plates 40 and 41 instead of providing pins 39 to engage the slots, so as to hold the frame from vertical displacement but permit removal thereof should occasion arise. The frame also includes upper and lower spacing and connecting or tie rods 43 and 44 having reduced ends forming shoulders to engage the inner faces of the side plates 40 and 41 so as to rigidly hold the same in uniform spaced relation parallel to each other with screws anchoring the ends of the rods at the outsides of the plates. The bottom edges of the plates 40 and 41 are provided with apertured ears 45 near their inner and lower corners and the cabinet or housing 46 which is shown as being substantially of rectangular form and open at the back, is provided with a bottom opening 47 flanged inwardly around the bottom edge. The cabinet is pivoted or hinged to the mechanism or frame near the lower rear corner of the machine to enable it to swing forwardly and downwardly to serve as a container for holding the clean towel roll, towel guide, soiled towel roll or any other articles which might otherwise be mislaid or difficult to manipulate during the loading of the machine and in the form shown, the bottom flanges or sides of the cabinet are shown provided with inwardly extending pivot pins 48 projecting in to engage the apertures of the pivot ears or lugs 45. The cabinet is sufficiently resilient to permit the sides to be separated so that the pins will spring into the apertures when the spreading pressure is released. Thus, the cabinet may be swung down beneath the frame with its open side upwardly so as to conveniently receive and retain as well as render accessible any parts placed therein. When closed, it is swung upwardly and may be held locked by any suitable means to prevent access to the interior of the cabinet. As shown, a locking screw 49 is provided in the top wall of the cabinet adjacent the open side and edge thereof which may be operated by a socket or plug wrench or key to engage the keeper or aperture of an angle bracket 50 secured to the mounting plate 36. If desired, a mirror 51 may be provided at the front of the cabinet and held at the back by a removable plate 52 over an opening in the front of the cabinet with suitable interposed cushion packing to prevent breakage of the mirror.

A bottom plate 53 is provided for the cabinet but is supported between the side plates 40 and 41 of the frame and this bottom also serves as a separator between the clean toweling roll and the ascending soiled toweling and can be swung clear of the back of the machine or back mounting plate 36 to provide ready access thereto for simplifying the task of loading as will be hereinafter more fully explained. The front edge of the bottom plate 53 is shown rolled or curled up as at 54 spaced from the bottom edge of the front portion or wall of the cabinet to provide an opening at this point through which the toweling T is adapted to extend, and at the back or rear corner is curved upwardly as indicated at 55 over the lower rod 44 to receive and support the clean towel roll when the same becomes small. This plate is then extended vertically as at 56 to form a separator or vertical partition in spaced parallel relation to the back mounting plate 36 and provide a narrow transverse vertical channel 58 therebetween through which the soiled or used towel may be passed to the winding or take-up roller, as will be later described and prevent contact thereof with the clean toweling. The top edge of the vertical plate portion 56 is provided with an angular portion 57 directed forwardly and then upwardly to frictionally spring or resiliently set under and against the upper rod 44 to hold the plate in position at the back of the frame in front of the channel or space 58. The bottom 53 is pivoted between the side plates 40 and 41 preferably in spaced relation to the rolled front edge 54 and for this purpose, may have angular brackets 59 of L-shaped form rigidly secured thereto at the top by riveting or otherwise and provided with outwardly extending pivot lugs 59a extending through correspondingly located apertures in the side plates 40 and 41. In this manner, the bottom plate together with the partition may be swung on the pivots so that the curled end 54 swings downwardly and rearwardly, the bottom portion 53 upwardly, and the vertical portion 56 upwardly, forwardly and downwardly so as to expose the back of the cabinet or frame when the clean towel roll is not in position.

The feeding roller is designated at F and is journaled between the plates 40 and 41 of the frame near the lower forward corners thereof, this roller being a friction or sand roller to insure gripping of the toweling T the same as the winding roller W and forms a portion of the mechanism for the winding of the soiled towel when the clean toweling is pulled out as will be later explained. The winding or take-up roll is designated at W and the clean towel in rolled form is designated at C, while the soiled towel roll is designated at S. An idle roller I is positioned beneath the clean towel roll C parallel to and slightly spaced rearwardly from the feeding roller F so as to take the weight of the clean towel roll when the latter is initially put into the machine to rest on the idle roller and against the vertical portion 56 of the plate where it forms a separator or partition where the soiled towel passes upwardly in contact with the rear face thereof. The idle roller I is journaled directly in the plates 40 and 41 spaced from the bottom 53 and when the clean towel roll C becomes sufficiently small in diameter, it may pass down against the curved portion 55 between the roller I and the partition 56. A pinch roller P is positioned between the feeding roller F and the idle roller I and when in operative position, projects below the latter but is designed to be pressed against the toweling on the feeding roller F. It will be noted that the strip or web of toweling from the roll C passes over the idle roller I down the pinch roller P, after which it passes upwardly over the feeding roller F so as to engage the frictional surface thereof over more than one-half the circumference thereof and the pressure of roller P insures positive gripping action between this roller surface and the comparatively rough surface of the toweling so that when the latter is pulled downwardly, as indicated by the arrows in Figs. 2 and 7, the feeding roller F will be positively rotated to uniformly and evenly feed the toweling. The toweling T then extends downwardly from the feeding roller F through the opening in the bottom of the cabinet between the front thereof and the curled portion 54 so as to hang in the form of a loop and then extends upwardly against the rear lower truss rod 44 in back of the partition 56 and then forwardly over and around the winding or take-up roller W for an area of over one-half the circumference thereof and then wound upon the soiled towel roller S which is mounted to be pressed toward the winding roller W as will be later explained.

Figure 7:
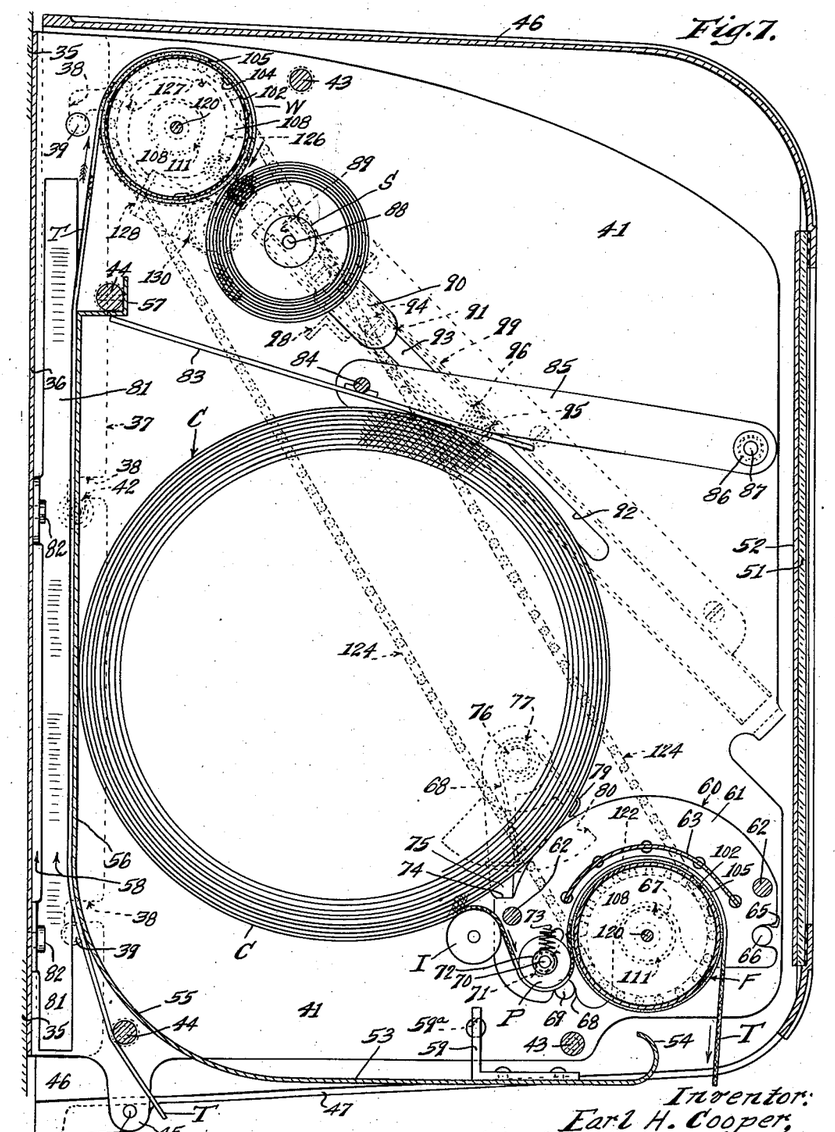
Fig. 7 is a similar view taken on the line 7—7 of Fig. 1.
Figure 8:
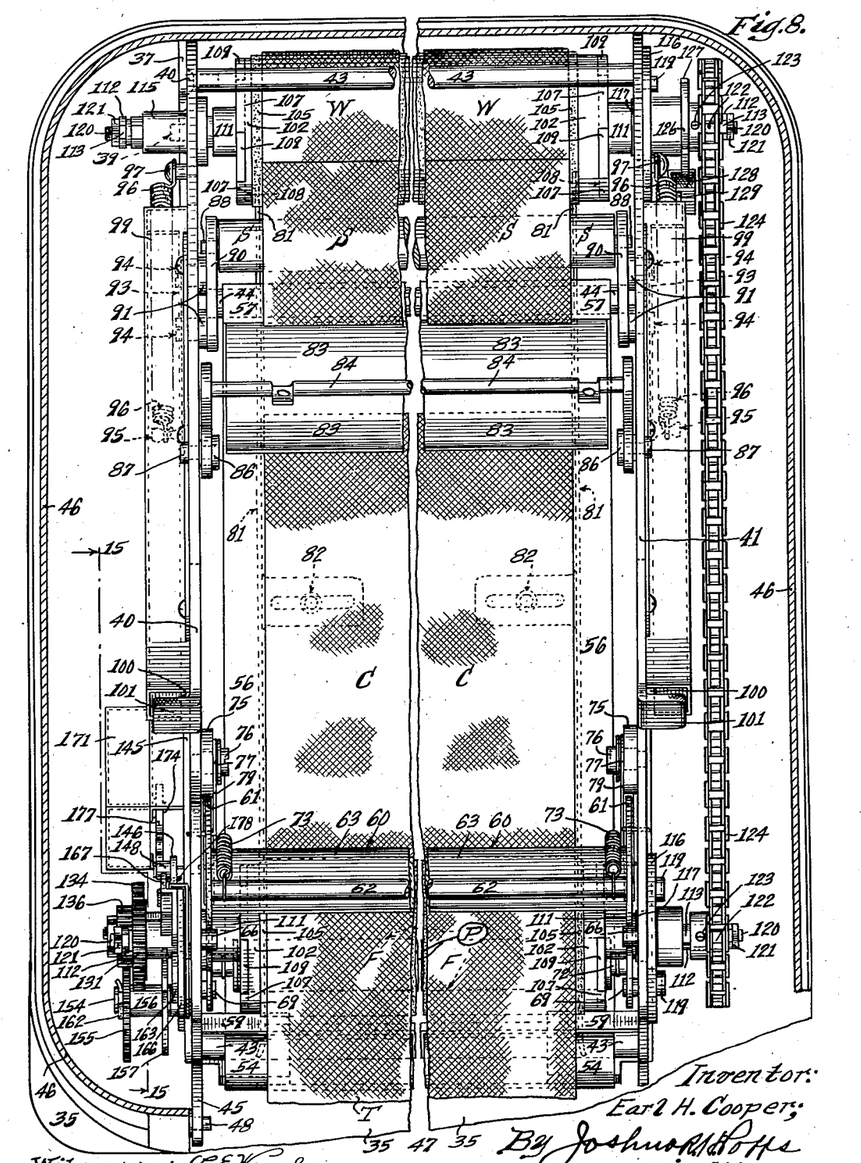
Fig. 8 is a sectional view taken on the line 8—8 of Fig. 6.
Figure 9:
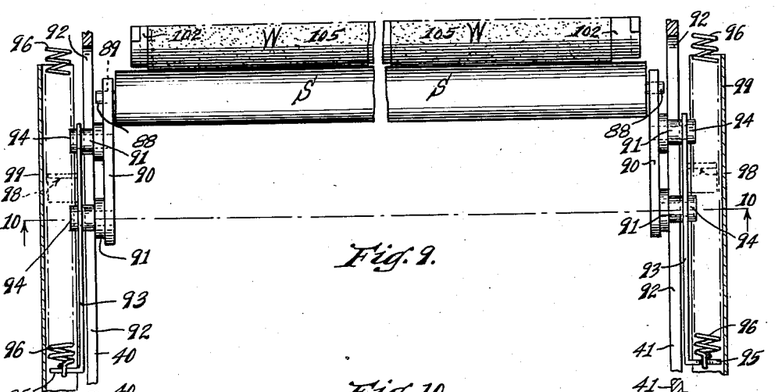
Fig. 9 is a sectional view taken on the line 9—9 of Fig. 6.
Figures 10, 11, 13, 14:
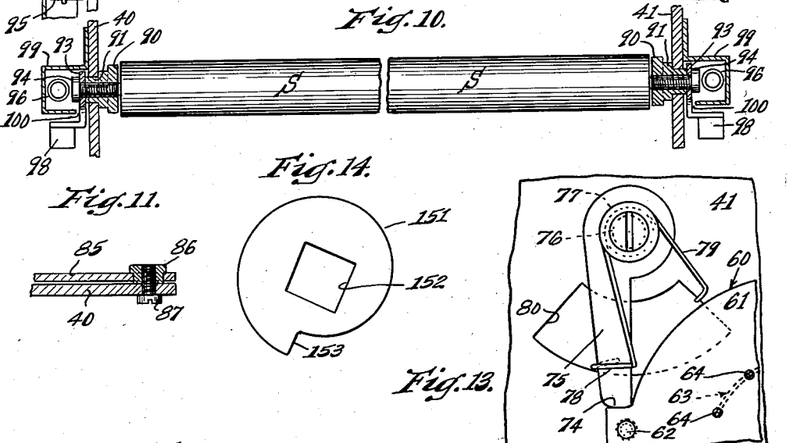
Fig. 10 is a sectional view taken on the line 10—10 of Fig. 9.
Fig. 11 is a sectional view taken on the line 11—11 of Fig. 6.
Fig. 13 is a fragmentary elevation of the pinch roller holding means.
Fig. 14 is a face view of a locking cam.
Figure 12:
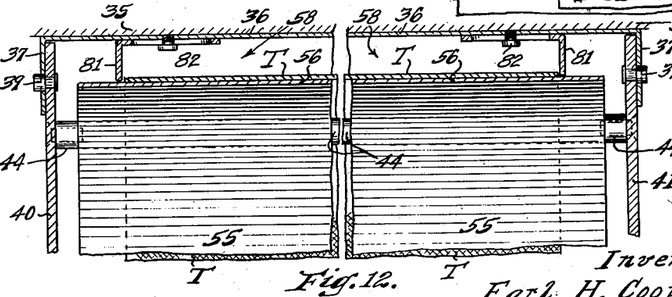
Fig. 12 is a sectional view taken on the line 12—12 of Fig. 6.

The pinch roller P is contained in an assembly which serves as a toweling guide and is separable from the rest of the mechanism, thereby permitting the positioning of the pinch roll after the toweling or clean towel C has been thrown in or placed in position. For this purpose the assembly includes a pinch roller frame 60 including arcuate end plates 61 connected by tie rods 62 and also a curved guide or guard plate 63 having tongues 64 spaced along the ends thereof to engage corresponding spaced holes in the end plates 61 so as to hold the guard plate in conformity to the feeding roller above and in spaced relation thereto so that the clean toweling may pass therebetween. The plates of the pivoted assembly or frame are detachably and pivotally mounted between the side plates 40 and 41 and for this purpose may be provided with recesses 65 in the outer ends of the arcuate plates 61 and communicating with the edges thereof to engage pivot lugs 66 extending inwardly from the side plates of the frame. The bottom edges of the end plates 61 have arcuate recesses 67 to accommodate the journals of the feeding roller F and fit around and over the same. The plates 61 are also provided with notches 68 corresponding to the notches or recesses 65 but located at the edges of the plates facing downwardly remote from the pivoted side at the lugs 66 to engage over lugs 69 which also project inwardly from the side plates of the frame so that when the pinch roller assembly is mounted on the lugs 66 and swung inwardly and downwardly under the clean toweling roll C the pinch roll P will press the toweling down between the feed roller F and the idle roller I and also draw the same taut to be fed in the direction indicated by the arrows as seen in Fig. 7. The pinch roller P has a spindle 70 the ends of which engage in inclined slots 71 in the end plates 61 in tangential or divergent relation to the periphery of the feeding roller F and spaced from the adjacent end of the guard plate 63. The pinch roll has its ends journaled in hubs or spacing collars 72 positioned inside the plates 61 and coil springs 73 are fastened to the hubs or collars 72 and to the tie rod 62 at the opposite or pivoted ends of the plates 61 of the pinch roller frame or assembly and hold the pinch roller toward the feeding roller by tending to move the same in the slots 71 toward the upper ends thereof. The top edges of the plates 61 adjacent the free ends thereof are provided with shoulders or notches 74 which are engaged by locking dogs 75 pivoted on stud pins 76 at the inner faces of the side plates 40 and 41 to hold the pinch roller frame or assembly 60 and toweling guide 63 in position. The coils of V-shaped springs 77 are mounted on the stud pins and one arm 78 hooks over the dogs 75 while the other arm 79 is anchored at one end of a segmental opening 80 in each plate so as to permit access to the dogs for releasing the same from the shoulders or notches 74 from the outside of the plates 40 and 41 whereby the pinch roller assembly may be swung outwardly on its pivots 66 and displaced from the frame. However, when the pinch roller assembly is mounted on the lugs 66 and swung inwardly as previously explained, the dogs 75 will automatically engage the shoulders 74 and lock the pinch roller assembly in position.

Means may be provided for evenly guiding the toweling through the machine consisting of suitable spacing means, blocks or guides along the sides thereof at the back and shown in the form of guides 81 for the toweling to engage the side edges thereof which may be of angular formation and if desired, provided with slots to receive screws 82 for permitting adjustment to the width of the towel. A separating plate 83 is pivoted off center as at 84 on a shaft extending transversely of the plate and rigidly secured thereto so that the short side of the plate extends forwardly and the long side extends rearwardly to engage under the angular portion 57 with the forward portion resting on the clean towel roll C. This plate is pivoted at the free inner ends of a pair of opposed arms 85 closely adjacent the inner faces of the side plates 40 and 41, these arms being pivoted as at 86 to said side plates with screws 87 for removably mounting the arms and plate in position. The soiled towel roller S has reduced trunnions 88 journaled in open bearings or recesses 89 in the upper ends of the bearings or bars 90 which have spaced flanged collars 91 adapted to slide in elongated forwardly inclined slots 92 in the side plates 40 and 41. These bearings or bars 90 are retained in position by strips or slides 93 mounted on the reduced ends of the flanged collars 91 and held by clamping screws 94. The slides 93 have outstanding angular or bent ends 95 to each of which a coiled spring 96 is anchored at one end and at the opposite end by means of screws or the like to the plates 40 and 41 of the frame as indicated at 97 so as to normally exert upward tension to press the soiled towel roller S toward the winding or take-up roller W. Each slide 93 is provided with a finger piece 98 bent therefrom to extend between the plate and a housing 99 of angular flanged construction secured to the outer faces of the plates 40 and 41 and each having a slot 100 through which said finger piece operates. Lugs 101 are provided on the side plates spaced from the lower ends of the guide ways or housings 99 to prevent slides 93 dropping out when disconnected.

Figures 28, 29, 30, 31, 32, 33, 34, 35:
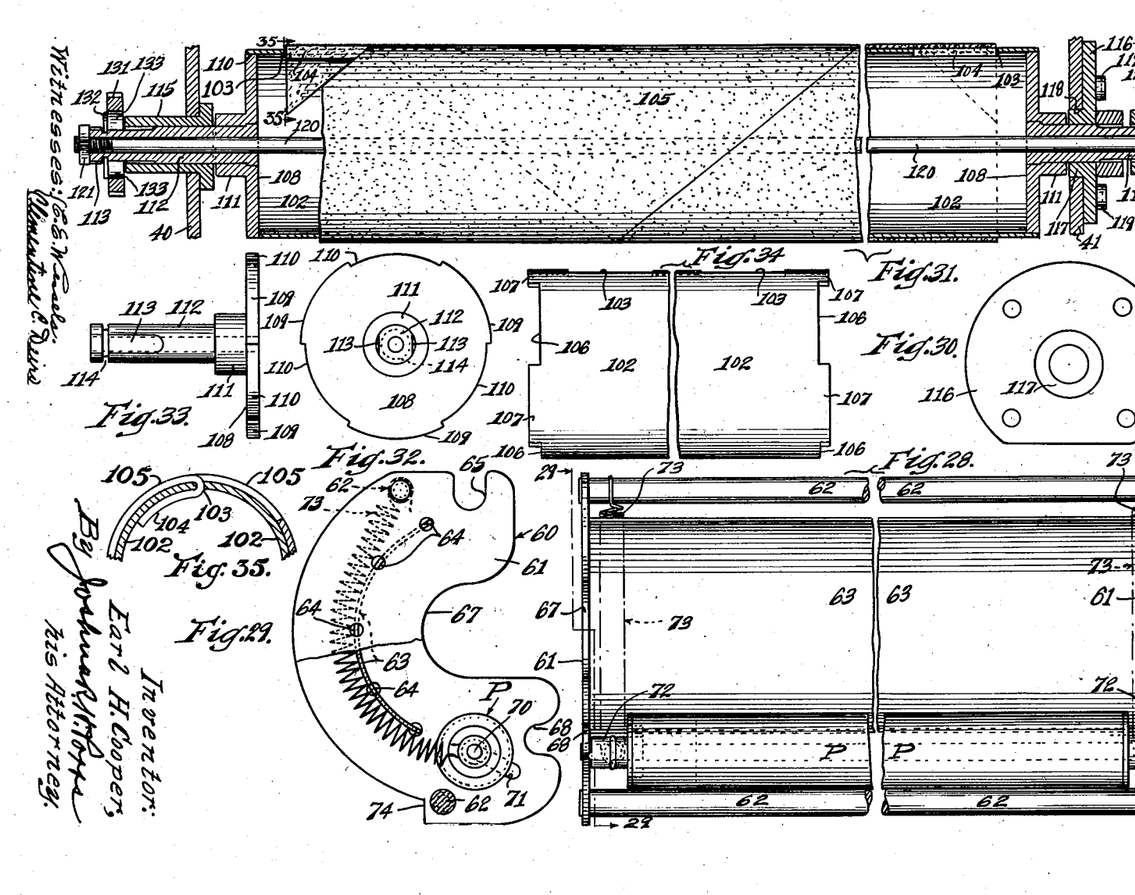
Fig. 28 is an elevation of the pinch roll assembly.
Fig. 29 is a sectional elevation taken on the line 29—29 of Fig. 28.
Fig. 30 is an elevation of a bearing plate for the feeding and winding rollers.
Fig. 31 is a sectional elevation of the feeding roller.
Fig. 32 is a face view of one end of the feeding roller.
Fig. 33 is an elevation of the parts shown in Fig. 32.
Fig. 34 is an elevation of one of the cylinders of the feed roller or winding roller.
Fig. 35 is a fragmentary section taken on the line 35—35 of Fig. 31.

The feeding and winding or take-up rollers F and W constituting the friction or sand rollers are substantially alike in construction and each comprises a tubular cylinder or tube 102 of metal or other suitable material and provided with aligned longitudinal slots 103 near each end through which the tapered ends 104 of a spirally wound emery or sand paper strip 105 are inserted and then anchored or glued, the strip spirally wound on the cylinder being suitably anchored or glued to the cylinder if desired. The ends of the cylinder are provided with spaced segmental notches 106 equidistantly spaced apart and preferably three in number forming corresponding intermediate projections 107. Disks 108 forming webs or heads fit the notched ends of the cylinder or body and for this purpose are provided with spaced projections 109 to enter the notches 106 and corresponding notches 110 to receive the projections 107 to reinforce and close the ends of the tubes as well as connect the cylinders and disks to cause them to rotate together. The disks or webs fit snugly in the ends of the cylinders and are provided with outwardly projecting tubular flanges or hubs 111 forming spacing means between the disks and the frame members 40 and 41 and receiving shouldered tubular trunnions 112 which are keyed to the disks and the hubs to turn therewith. The tubular trunnions 112 are provided with two opposite flattened surfaces 113 at their outer portions and a peripheral groove 114 circumscribing the same and intersecting the flattened portions. Flanged bearings 115 are mounted on the trunnions 112 to rotatably support the trunnions and rollers and have their flanges positioned within and against the inner face of the plate 40 adjacent the hub 111 at one side of the frame. At the opposite side of the frame a separate or removable bearing plate 116 is bolted to the plate 41 and has a sleeve or hub 117 extending into an opening 118 of larger diameter than the hub 111 as seen in Fig. 31. Screws 119 secure the plate 116 in position and a tie rod 120 extends through the roller and the tubular trunnions or bearings 112 and has its threaded ends anchored as by nuts 121 thus to hold the parts in assembled relation and against separation or individual end thrust or movement by engagement with the outer ends of the tubular trunnions or bearings 112. At one side of the frame, sprockets 122 are mounted on the flattened portions 113 of the trunnions and fixed by a set screw 123 while an endless drive member or chain 124 is trained around the sprocket wheels to cause the friction rollers to rotate in unison. They are held in position by spring cotter pins 125 which engage the annular grooves 114 at one end, preferably the right side of the machine although this is optional. The corresponding end of the winding roller W is provided with a ratchet wheel 126 on the flattened portion 113 of the trunnion 112 with its hub or collar between the plate 116 and the hub or collar of the sprocket wheel 122. (See Fig. 5.) At the bottom roll F, there is no ratchet wheel, but the collar is retained. (See Fig. 31.) The teeth 127 of the ratchet wheel 126 are engaged by a pawl 128 pivoted at 129 to a boss on the plate 41 and held by a spring 130 into engagement with the teeth 127 so as to prevent backward or retrograde movement of the winding roller so that the soiled towel cannot be unwound from the soiled towel roller and so that the parts can only be driven in one direction tending to feed the clean toweling and wind the soiled toweling. A collar 126a is mounted to take up space on the trunnion 112 of the roller F at the bottom, in lieu of the ratchet wheel 126 as provided on the roller W at the top where the ratchet wheel 126 and pawl 128 are provided to prevent reverse rotation, and to avoid end thrust. However, this construction permits quick removal and replacing of a friction roller by simply removing the nuts 121, rods 120 and drive parts including the sprocket wheels 122 and ratchet wheel 126, and plates 116 by removing the screws 119 of the plates 116 so that the hubs 111 at one side can be displaced outwardly through the corresponding openings 118 and the webs or disks 108 set in the ends of the body 102 displaced outwardly so that the body or cylinder can be removed and a new one inserted and secured in position. Thus, the notched construction of the friction or sand rolls where the disks or webs are set into the ends of the body or cylinder of the roll enables replacement of the worn friction or sand surface by substitution of the body only by reason of the separate bearing plates at the right hand or side plate 41 and the entire removal and substitution can be effected without disassembling the machine. The tie rod construction of the assembly converts any transverse load on the sand roll hubs into a lineal stress on the tie rod and not on the web assembly alone. Thus, if under extreme abuse something must give way, the resulting deformity will only be the stripping of the threads on the tie rod. Thus, the hubs 111 may become slightly loose on the trunnions 112 but not broken and the machine will not be out of service. The cost of this common type repair is reduced to just a fraction of the usual cost or entirely eliminated by this construction.

Figure 6:
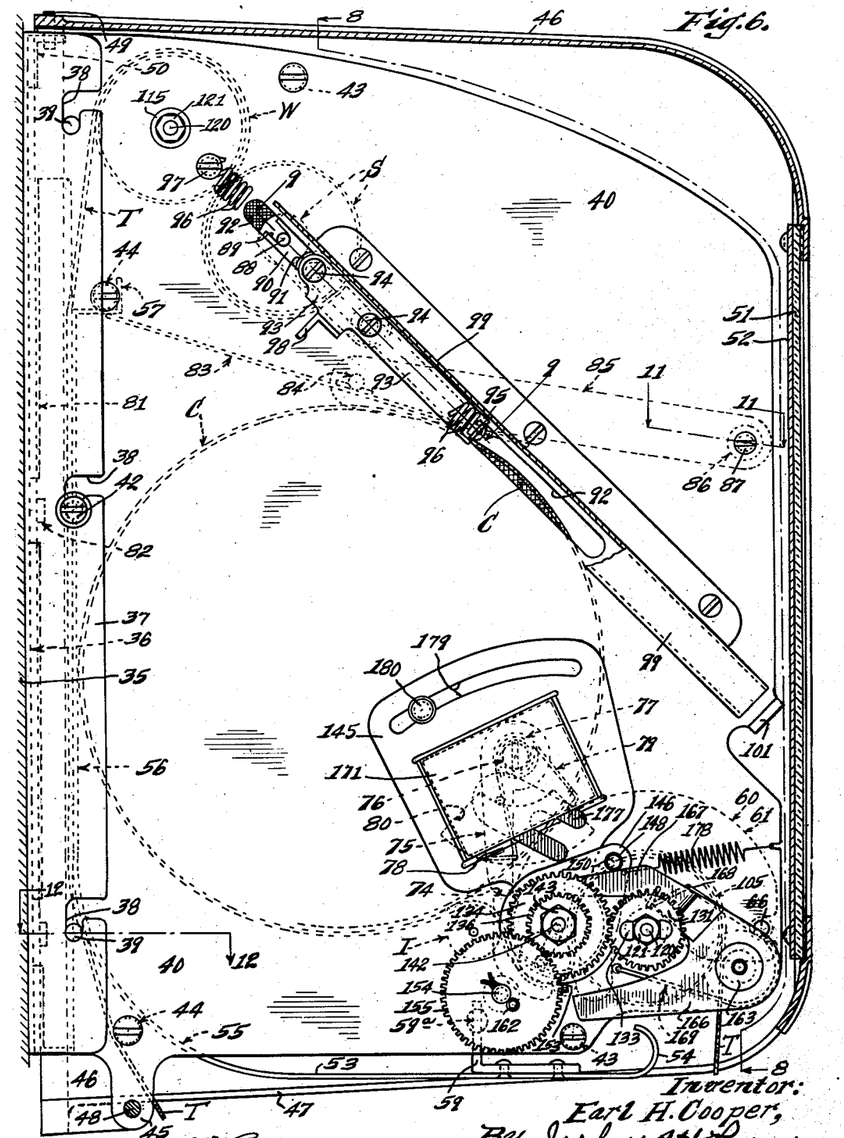
Fig. 6 is an enlarged sectional elevation taken on the line 6—6 of Fig. 1.
Figure 15:
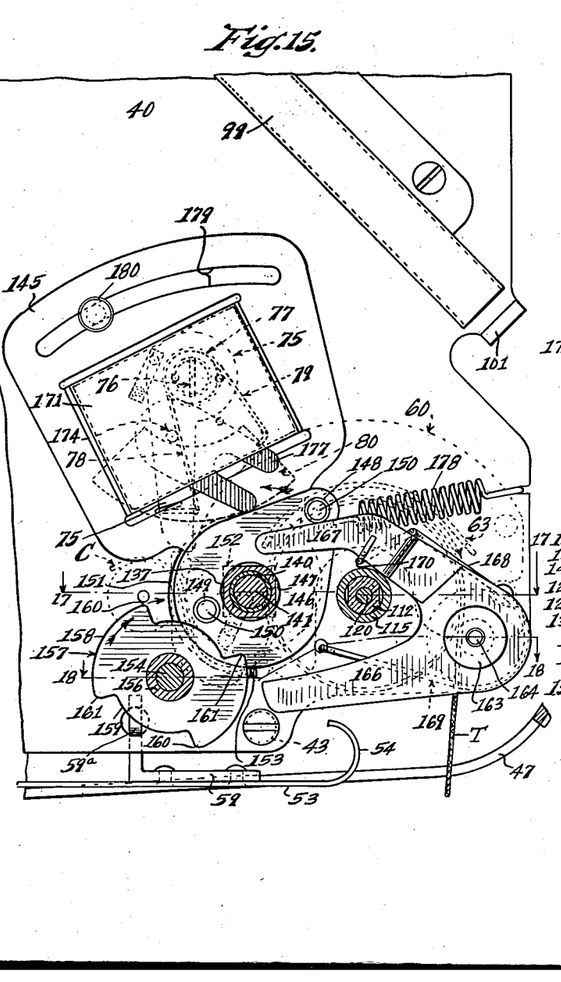
Fig. 15 is an enlarged elevation of the towel feed control, timing and indicating mechanism taken on the line 15—15 of Fig. 8 with the gears omitted.
Figure 16:
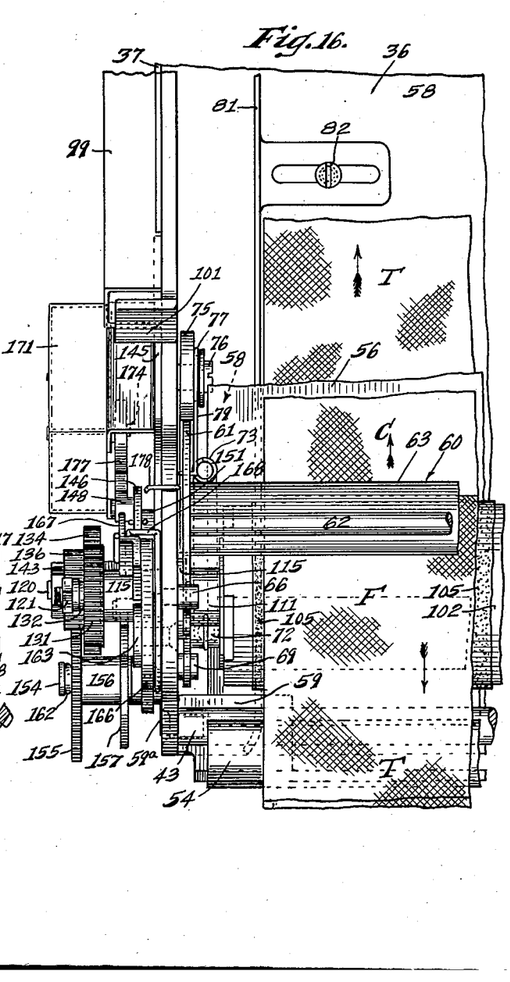
Fig. 16 is a front elevation of the mechanism shown in Fig. 15 with the gears in position.
Figures 17, 18, 19, 20:
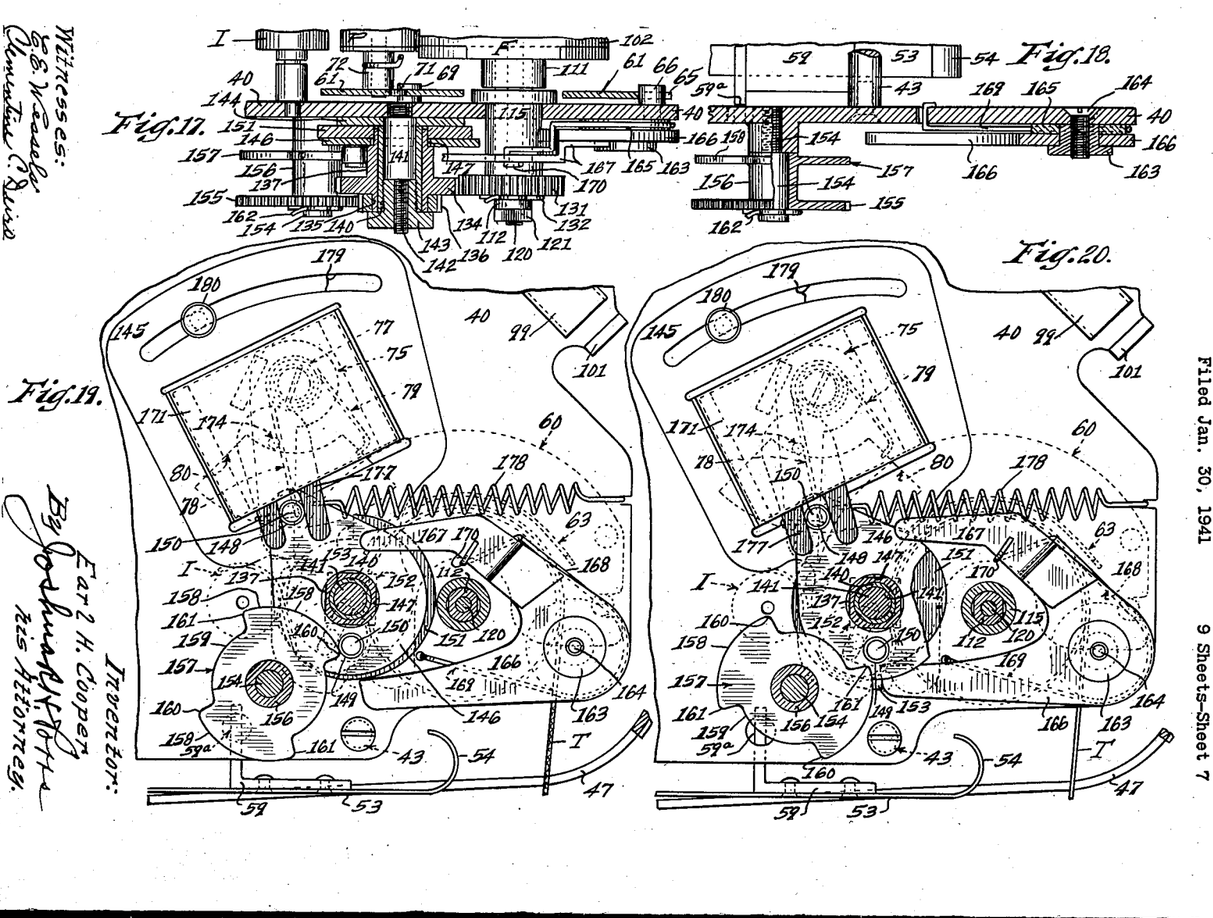
Figs. 17 and 18 are horizontal sections taken on the lines 17—17 and 18—18 of Fig. 15.
Fig. 19 is a view similar to Fig. 15 but showing the position of the parts after the feed roller has turned approximately one-half of the cycle.
Fig. 20 is a similar view with the parts in position after the feed roller has been turned a complete cycle.
Figure 21:
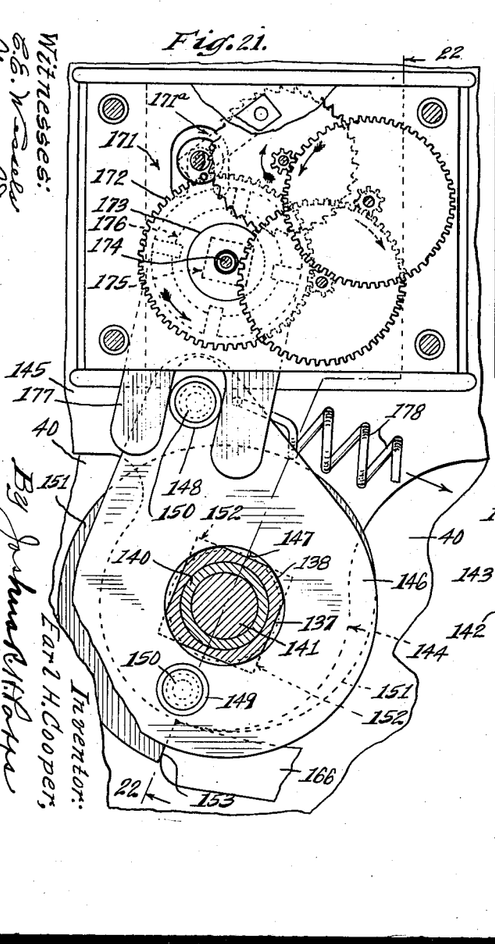
Fig. 21 is an enlarged section taken on the line 21—21 of Fig. 22 with the parts in the position shown in Fig. 20 and showing the timing gear.
Figures 22, 23, 24, 25, 26, 27:
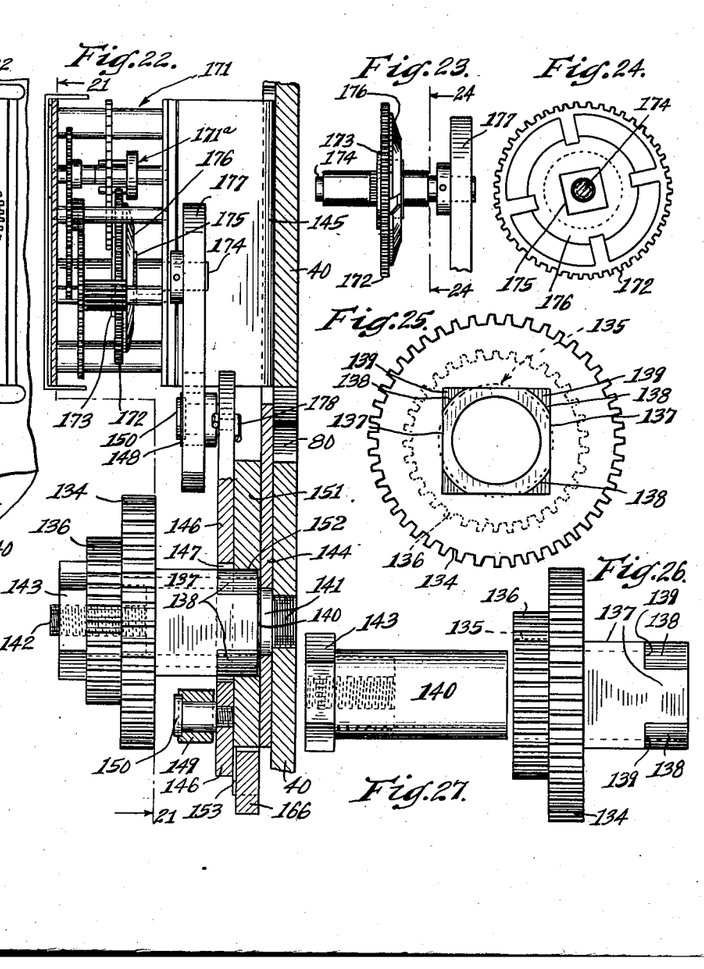
Fig. 22 is a section taken on the line 22—22 of Fig. 21 with the driving gears of the control mechanism in position and the base plate in elevation.
Fig. 23 is a detailed edge view of the friction clutch drive of the timing gear or clock mechanism.
Fig. 24 is a section taken on the line 24—24 of Fig. 23.
Fig. 25 is an enlarged face view of a driving gear.
Fig. 26 is an edge view of the driving gear shown in Fig. 25.
Fig. 27 is an elevation of a bearing sleeve for said gear.

The control mechanism of the machine for the feeding, winding, timing and time release mechanism is preferably mounted at the left hand end of the lower friction or feeding roller adjacent the plate 40 at the outside and for this purpose a spur gear or pinion 131 is mounted on the flattened portions 113 of the trunnion 112 and is held in position by a spring cotter pin 132 engaging the annular groove 114 adjacent the flanged bearing 115 at that side. The gear 131 is also held by keys 133 fitting the flattened portions 113 and registering recesses in the gear as shown in Figs. 6 and 31. A gear 134 meshes with the gear 131 and its hub extension 135 carries a smaller gear or pinion 136 on the outside. At the inside, the hub 135 is provided with a squared portion 137 having four flat surfaces the inner portions of the corners of which are rounded as at 138 (see Figs. 25 and 26) forming corner shoulders 139 facing inwardly. A sleeve 140 fits within the hub 135 and forms a bearing for the gears 134 and 136. This sleeve is mounted on a post 141 screwed into a threaded aperture or hole in the plate 40 as seen in Figs. 17 and 22 and the post has a reduced and threaded outer end portion 142 for engagement by a nut or internally threaded bore of a wrench head or hexagon flange 143 which is also threaded into the sleeve 140. A spacing plate 144 is pivotally and removably mounted on the post 141 inside of the sleeve 140 and constitutes an apertured extension of a base plate 145 of a timing gear or clock mechanism 171 to be later described. An arm or cam 146 is loosely mounted on the rounded portion 138 against the shoulders 139 to take up end thrust or play of the arm or cam 146 and an eccentric disk or cam 151 to be later described, and prevent axial shifting thereof, and has a circular aperture 147. This arm is circular with a tapered extension forming an eccentric portion which carries an outwardly projecting roller 148 laterally from the free end of the arm and also a lateral roller 149 offset from a radial line from the center axis of the plate to the center axis of the roller 148, both rollers being mounted on lateral pivot pins 150. An eccentric disk or cam 151 has a squared aperture 152 to engage the squared portion 137 of the hub 135 that is, the flat sides of the portion 138, so as to turn therewith together with the gears 134 and 136 which are driven by the rotation of the gear 131. The eccentric cam 151 has a radial shoulder 153 formed by the eccentric portion for a purpose to be hereinafter explained. A post 154 is mounted on the plate 40 through a threaded aperture therein having a corresponding threaded sleeve or boss as indicated in Fig. 18 and a gear 155 is loose on the post and has a sleeve 156 bearing thereon to which is fixed a cam 157 at its inner end. This cam has concentric high portions or edges 158 and low faces or edges 159 intermediately therebetween and both opposing one another to form resulting radial shoulders 160 and 161 diametrically opposite and facing in opposite directions at diagonally opposite ends of said high and low portions. A spring cotter pin 162 holds the gear 155 and the cam in position in an annular groove on the post 154. A flanged bearing sleeve or stud 163 is held on the outside of the plate 40 by a locking screw 164 threaded therethrough with an interposed spacing washer 165 and a locking pawl or dog 166 is mounted on the sleeve 163 to engage the shoulder 153 and hold the cam 151 and also all of the parts operatively connected thereto including the gears and feeding roller F positively against rotation in the direction tending to feed the clean toweling. An arm 167 is provided on the pawl 166 in acute angled or V-shaped relation thereto and a spring 168 is mounted on the washer 165 at its coiled portion with one arm 169 anchored on the plate 40 of the frame while the other arm 170 is anchored against the arm 167 to exert tension for normally holding the pawl in position to engage the shoulder 153. The timing or clock mechanism 171 is mounted on the base plate 145 disposed against the plate 40 and this base plate has struck out portions which support the frame of the timing or gear mechanism which constitutes a perceptible or discernible means by which the user can ascertain when a towel section cannot be pulled out. In other words, in this instance, it constitutes an audible means to indicate to the user when the machine is inoperative and when the toweling may not be pulled out or moved, usually during the use thereof or during the wiping operation and continuously during the period between when the toweling has been moved and is locked against movement by the pawl 166 engaging the shoulder 153 until released by the disengagement of the pawl 166 therefrom when it may be moved again as will be hereinafter more fully explained. The timing gear or clock mechanism 171 includes a train of gears mounted in its frame and also comprises a ratchet or escapement mechanism 171a and causes timed operation of the timing gear or clock mechanism by oscillation with the two pins or pawls thereof automatically engaging the teeth of the ratchet or escapement wheel adjacent thereto as seen in Fig. 21, while preventing unrestrained free rotation such as would prevent regulation of the timing which permits rotation in one direction only or prevents backward rotation. It also includes a gear 172 loose on a hub 173 fixed on a shaft 174 and having a squared portion 175 on which a spring clutch plate 176 is fixed to frictionally engage one face of the gear 172. A forked arm 177 is fixed to the shaft 174 at its inner end to engage the roller 148 upon pulling out a section of toweling and then to time the release thereof under the control of the clock mechanism or timing gear under the action of a coiled spring 178 forming a motor or power device which is connected to the free end of the arm 146 and at its other end to the plate 40 of the frame, all as shown in Figs. 15 to 26, inclusive. The base plate 145 has an arcuate slot 179 concentric to the post 141 constituting a pivot of the plate 145 at extension 144 for engagement by a set screw 180 threaded in an aperture in the plate 40 so as to adjust the base plate 145 and the timing gear or clock mechanism 171 and also the forked arm 177 so as to vary the angular position of the forked arm and the time duration of engagement of the roller 148 therewith and its release therefrom so that the roller on the arm 146 under the action of the spring 178 will strike the angular arm 167 and unseat or disengage the pawl 166 from the shoulder 153 at the end of the time interval during which the machine is inoperative so that another section or length of toweling cannot be pulled out until the end of this period which is rendered perceptible or discernible to the user, in this case by the audible action of the clock mechanism continuously and entirely during the period after a section of toweling has been pulled out and until released, when another section of toweling may be pulled out so as to obviate pulling successive sections of toweling without an intermittent restraining action and obviate waste by such useless pulling on the toweling or damage to the machine.

*Operation*

Figures 1, 2, 3, 4, 5:
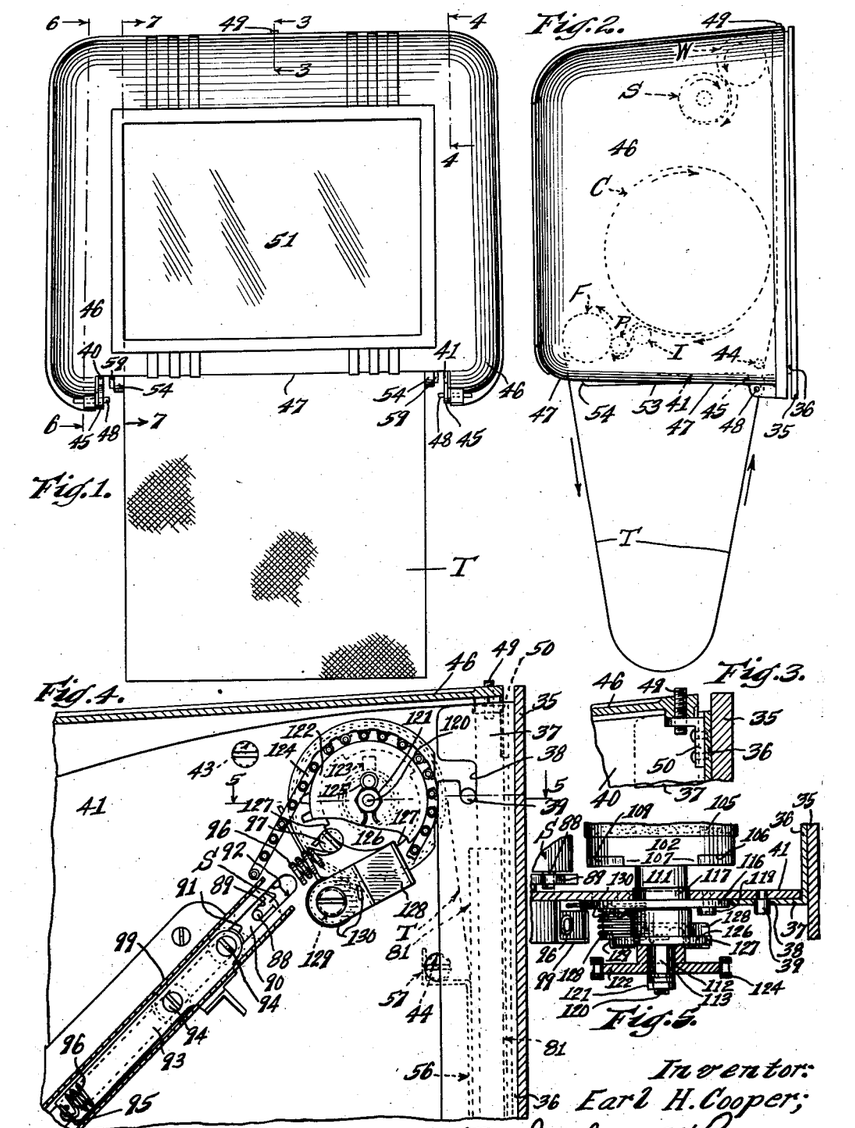
Fig. 1 is a front elevation of a roller towel cabinet in accordance with the invention.
Fig. 2 is a side elevation thereof.
Fig. 3 is an enlarged fragmentary detailed vertical section taken on the line 3—3 of Fig. 1.
Fig. 4 is a similar view taken on the line 4—4 of Fig. 1.
Fig. 5 is a detailed horizontal sectional view taken on the line 5—5 of Fig. 4.

In the operation of the device, assuming that the cabinet is empty of toweling, the housing or cabinet proper is released by turning the locking screw 49 to disengage it from the bracket or keeper 50 whereupon it may be swung 90 degrees forwardly and downwardly on the hinged connection or pivots 48 against the vertical support 35 below the mechanism with the open side which normally fits or is disposed toward the vertical support at the back disposed upwardly and the open bottom at the rear or back so that the side, top and front walls of the cabinet will form a receptacle for receiving a roll of clean towel. It will also serve as a container for the towel guide or pinch roll assembly 60 which is removed from its operative position by swinging it upwardly on the pivots 66 and removing it from the frame. It will also support the soiled towel roller S or any other articles which might otherwise be mislaid or difficult to manipulate during the loading of the machine. The soiled towel roller S is merely displaced from the open bearings or recesses 89 in the upper ends of the bearings 90. A length of clean toweling T is then unrolled from the clean towel roll C and with the plate 53 swung on its pivot so as to dispose the partition or separator 56 forwardly and downwardly relative to its normal vertical position where it forms the space 58 in connection with the back mounting plate 36, the end of the toweling is then passed under the bottom of the machine in back of the rods 44 through the space 58 which has been opened by the forward tilting of the plate portion 56 so as to render accessible the back of the machine to facilitate loading. The fact that the bottom of the cabinet is integral with the separator which is normally positioned between the clean toweling roll and the ascending soiled toweling and can be swung clear of the back of the machine to provide ready access thereto greatly simplifies the task of loading. The toweling is then extended over the winding or take-up roller W and the end portion thereof wound upon the soiled towel roller S which is placed in position in the bearings 90 and pressed against the roller W by the tension of the springs 96. The plate 53 is then swung back into position with its vertical portion or partition 56 in front of the ascending toweling where it is held by the angular portion 57 frictionally and resiliently engaging the upper rod 44. With sufficient length of the clean towel depending below the machine in the form of a loop as shown in Figs. 1 and 2, the length of which may be varied as desired, the clean roll of toweling C is then thrust or placed in position as shown in Fig. 7 resting upon the idle roller I and the partition or separator 56 spaced above the bottom portion 53. The separating plate 83 which automatically floats with the pivoted arms 85 may be raised to facilitate insertion of the clean towel roll and will move down as the clean toweling is dispensed therefrom but normally may assume the position shown in Fig. 7 but always keeps the soiled toweling out of contact with the clean toweling continuously during the time when the latter is unwound from the roll C and being wound on the roller S. The pinch roller and guide assembly or frame is then inserted in position by engaging the notches 65 with the pivots 66 and swinging the same rearwardly and downwardly on said pivots so that the pinch roller P will pass or snap by the periphery of the clean toweling roll C and the idle roller I permitted by the slots 71 in which the pinch roller P is journaled and the normal tendency of the springs 73 to hold the pinch roller at the inner ends of the slots. The placing of the clean toweling roll C in position as previously explained will cause the toweling T to pass over the feeding roller F and the idle roller I so that when the pinch roller assembly is placed in position as just described, the pinch roller will loop the toweling downwardly by pressure thereon between the idle roller I and the feeding roller F and will be placed under tension by the springs 73 due to the inclination of the slots 71 and the tangential relation or convergence thereof toward the periphery of the feeding roller F and the tendency of the springs to press or hold the pinch roller against the feeding roller F and toweling thereon below its axis 120 and at the same time the guard plate or guide 63 will be positioned over the feeding roller and the assembly or frame held in position by engagement of the notches 68 with the pins or lugs 69. The pinch roll is contained in an assembly which serves as a toweling guide and is separable from the rest of the mechanism thereby positioning the pinch roller after the toweling has been thrown or placed in position. This makes threading of the toweling unnecessary. Also, owing to the fact that the pinch roller is positioned under spring tension, no towel slippage is required to set the pinch roller firmly and in position pressing against the feeding roller with the interposed toweling. Most, if not all other machines, require motion of the toweling to accomplish this function. The machine is now ready to operate and when a clean wiping section of toweling is desired, the user merely grasps the clean toweling depending below the machine at the open bottom below the feeding roller F and adjacent the curled portion 54 and a downward pull exerted thereon. Due to the frictional engagement of the toweling with the feeding roller F, the latter will be rotated as well as the pinch roller P and the idle roller I to unwind the toweling from the clean towel roll C. Due to the feeding and winding rollers being positively connected by the chain 124 on the sprocket wheels 122, the winding or take-up roller W will be rotated in the same direction as the feeding roller F thereby advancing the soiled toweling around the winding roller and causing it to be wound on the soiled towel roller S by reason of the latter and the toweling thereon being pressed against the winding roller W by the springs 96 which elevate the bearings 90 in the slots 92. By holding the soiled toweling roll in contact with the take-up or winding roller by spring tension instead of depending upon gravity as in most, if not all other machines, this produces a more uniformly and tightly wound roll of soiled toweling, thus reducing the space requirement of the roll. The floating separator or plate 83 which can assume any position required by the changing sizes and positions of the toweling rolls is used to effect a conservation of space by using the space given up by the diminishing clean roll to accommodate the increasing size of the soiled towel roll.

In order to regulate the feeding or advancing of the toweling as well as the winding and the time interval of the perceptible or discernible signal which, as previously explained, is audible in this instance due to the buzzing sound of the operation of the gears of the timing or clock mechanism 171 and thus indicate to the user when the device is inoperative or when the toweling may not be pulled out, as well as give an audible, discernible, or perceptible signal continuously during the period when the towel is normally used for the wiping operation or the period between the time when the towel is pulled or moved out and held and the time when it may be moved again, the following operation takes place. When the toweling is pulled to rotate the feeding roller F and the winding roller W, the latter will be permitted to rotate by the pawl 128 riding over the teeth of the ratchet wheel 126 but restraining the same against reverse rotation so that the toweling cannot be unwound from the soiled towel roller. This also turns the gear 131 which in turn drives the gears 134, 136 and 155 thus rotating the cam or eccentric 151 and the cam 157 rigid with gear 155 until one of the shoulders 160 engages the roller 149 to swing the arm 146 rearwardly and cause the roller 148 to engage the fork of the arm 177 against the action of the spring or motor 178. During this time, the locking pawl 166 rides on the surface of the eccentric 151 being so held by the spring 168. The forked arm is held in this position during the continued rotation of the eccentric cam 151 and the cam 157 while a high portion 158 rides against the roller 149 until the latter roller passes down the shoulder 161 or is released into the low portion 159 at the end of said high portion to release the pressure against the roller 149 tending to hold the arm 146 and its roller 148 in engagement with the forked arm 177 to hold the latter down toward the left thereby permitting the arm 146 to be pulled to the right by the spring 178. However, by the time the high portion 158 passes the roller 149 the cam 151 will have rotated to the left in an anticlockwise direction into position so that its shoulder 153 will be engaged by the locking dog or pawl 166 as shown in Fig. 20 of the drawings, and the roller 149 having passed into and free to move at the low portion 159 while the cam 157 is checked, the arm 146 and roller 149 will be released and free to move to the right or clockwise under the action of the motor or power means formed by the spring 178 as seen in Figs. 15 and 20, that is, the clock mechanism 171 is free to act and move arm 146 whereby the spring or power means 178 will operate the timer signal after the cam 157 has turned one-half of a revolution so that the spring 178 will act to swing the forked arm 177 forwardly and upwardly while the roller 148 is retained in the recess of the forked arm 177 until the roller can pass out of the fork or recess thereof due to the arc swung by the arm 146 instead of being restrained by the upper edge of the recess until such position has been reached. In the downward movement, the roller 148 will engage the lower edge of the recess or arm of the fork and the forked arm 177 by reason of the slippage at the friction clutch plate 176 against the face of the gear 172 can swing down free of rotation of the train of gears of the timing or clock mechanism. However, in the upward movement of the arm 177 under the action of the spring 178, the spring clutch plate 176 will engage the gear 172 and cause the clock mechanism to be actuated and to restrain the movement of the forked arm so that it will take a certain definite predetermined and preadjusted period for the arm to move into releasing position with respect to the roller 148 as shown more particularly in Figs. 6 and 15 of the drawings. In this position the arm 146 will be accelerated in its movement under the action of the spring 178 to snap quickly and with considerable force against the arm 167 to release the pawl 166 from the shoulder 153 whereby the dispensing means may again be operated to feed the toweling web, sheet or strip. During this movement after the roller 149 has been allowed to drop down the shoulder 161 into the low portion 159 and the pawl 166 is engaging the shoulder 153, the feeding roller will be restrained against further rotation together with the eccentric or cam 151 and the cam 157 so that during the return movement of the forked arm and the arm 146, a certain definite time interval will be required before another length of toweling can be dispensed or pulled out after the pawl 166 has been released. It is important to note that the arm 146 is free to turn to the right or clockwise independently of the cam 151 by reason of being mounted on the rounded portions 138 of the hub 135 while the cam 151 must rotate with the hub 135 and thus with the feeding roller and cam 157 due to the gearing train or drive connections therebetween. Owing to the audible signal which is given by the operation of the gears of the timing or clock mechanism during the slow return movement of the forked arm and the arm 146 under the action of the spring 178 by reason of the roller 148 being held in the forked arm, a continuous signal will be given to indicate to the user the period during which the toweling may not be pulled out. This signal is perceptible or discernible for the entire period when the control mechanism is held locked by the pawl 166 engaging the shoulder 153 or after a predetermined length or section of toweling has been pulled out and during which time the device is rendered inoperative. Thus, there is provided means to indicate to the user the time interval during which the towel may not be pulled out which time interval is usually employed in the use of the towel or during the wiping operation or, in other words, the period after the towel has been pulled out or moved and when it may be moved again. This prevents the toweling from being continuously pulled out or successively dispensed without an intermittent interval when it is held locked and until released so as to economize in the use of the toweling and prevent waste. It may also be pointed out that an important feature of the invention is the fact that in pulling a length of toweling, the feeding or measuring roll F is turned other than an integral number of revolutions thereby assuring more than one stopping position. The value of this feature is that inasmuch as the greatest wear on the abrasive surface of the roller occurs at the pinch roll position, this mechanism distributes the wear over more than one spot on the roll instead of at the same point each time and thereby the useful life of the rollers F and W are considerably lengthened. It is believed that a clearer understanding of this feature will be had by explaining that in Fig. 6 the locking dog or pawl 166 is shown disengaged from the shoulder 153 after the timing or clock mechanism has operated and the roller 148 has been released to strike the arm 167 for this purpose as previously explained so that the toweling may now be pulled out. Fig. 15 shows the same position of the parts but with the gears omitted. While the gear ratio and the relative turning of the feed roller F, cam or eccentric 151 and cam 157 may be varied, for purposes of illustration and in the embodiment shown, for each one and one-quarter revolutions constituting a cycle of operation of the feed roller, the cam 151 is turned one complete revolution by the arrangement of the gear train shown and the cam 157 is turned one-half of a revolution and the diameter of the feed roller is such that the toweling may be fed out approximately eight inches or more, although this is optional, and may be increased or decreased as desired. It will also take approximately eight seconds for the timing or clock mechanism to release the roller 148 from the forked arm 177 due to the retarding of the movement of the latter under the action of the spring 178 before the roller 148 strikes the arm 167 and disengages the pawl 166 from the shoulder 153 and thereby releases the towel feeding mechanism so that the towel may be advanced and a clean section drawn for wiping purposes. Fig. 16 shows the position of the parts as in Fig. 15 and Fig. 21 shows the position of the parts after the toweling has been pulled out and the controlling mechanism in locked position before the timing mechanism starts its operation on the return stroke or movement. Fig. 19 shows the position of the parts after the toweling has been half fed out or the parts moved one-half of a cycle and the feed roller turned approximately five-eighths of a revolution and the arm 146 moved to the left by engagement with the adjacent shoulder 160 with the cam 151 turned one-half of a revolution. The turning of the arm 146 causes the roller 148 to engage the forked arm 177 and move this arm free of the gear 172, the clutch plate 176 slipping during this movement so that the timing or clock mechanism remains inactive. The cam 151 being fixed to the squared portion 137 will be driven by the gears and the arm 146 is turned by the cam 157 engaging the roller 149 at the shoulder 160 and at the limit of the movements of the arms 146 and 177 as shown in Fig. 19, they will remain in the same position during the continued rotation of the cam 157 until the high portion 158 passes the roller 149 and the latter on the action of the spring 178 is free to move down the shoulder 161 into the low portion 159 to permit the clock mechanism or timing gear 171 to operate for an exact period determined by the angular adjustment of the base plate 145 at the extension 144 on the pivot post 141 and the timing gear therewith through the medium of the slot 179 and held by the set screw 180. The further the base plate 145 is set to the left the shorter will be the time interval during which the locking dog 166 is engaged and the toweling held locked against being pulled out and conversely, when the plate 145 is set to the right, said time interval will be lengthened or increased accordingly. This is due to the fact that the angular position of the forked arm 177 will be changed so that the open end of the slot, recess or verge thereof will face more quickly or more slowly in a releasing direction as to the roller 148 and as soon as the latter is released under tension of the spring 178 it will strike the arm 167 and disengage the dog 166 from the shoulder 153 by the impact and thus permit free movement of the toweling and the feed roller F as well as the simultaneous rewinding or take up of the soiled toweling upon the soiled towel roller S by the spring pressure engagement of the latter with the simultaneously driven winding roller W by the drive connection between the feeding and winding rollers. However, the reverse rotation will be positively prevented by the ratchet mechanism on the winding roller consisting of the ratchet wheel 126 and the pawl 128 engaging the teeth 127 thereof so that the device may not be put out of order by reverse or retrograde movement of the toweling. Fig. 20 shows the position of the parts after the toweling has been completely pulled out a predetermined length and the feeding roller F has turned approximately one and one-quarter revolutions or for a complete cycle of operation with the roller 149 in position to be released from the high portion 158 of the cam 157 down the shoulder 161 and into the low portion 159 so that the timing or clock mechanism 171 or the gearing composing the same will start to operate and will continuously indicate to the user by a perceptible or discernible signal which in this instance is audible and may be produced in any suitable way, but as shown, is the sound of operation of the clock mechanism, the time duration during which the toweling may not be pulled out thereby to obviate pulling on the same and possibly putting the mechanism out of order. These signals will be intermittent or alternate between each pulling of a length of toweling and the next pulling so as to indicate when the toweling is locked against movement and may not be moved or pulled, as well as when it is released and may be moved again. During this time interval, the cam 157 as well as the feed roller F and the cam or eccentric 151 will remain stationary while the arm 146 which is free to turn independently thereof on the rounded portion 138 moves with the forked arm 177 of the timing mechanism 171 and remain stationary until the toweling is again pulled out to reset the locking mechanism and the timing mechanism to permit the latter to operate and release the locking mechanism after the desired time interval. By reason of the novel ratio of feeding, winding, timing and time release mechanism, as described, whereby the friction feeding and winding rollers are advanced other than an integral number of revolutions each time a length of toweling is pulled down or out for use and arranging the toweling so as to cause the strip of toweling to extend around or engage with the friction surfaces on said rollers at the major or practicable maximum portions of their peripheries, but more particularly to cause the engagement of the pinch roller P with the roller F as well as the soiled towel roller S with the winding or take-up roller W at a different point on the periphery of the feeding and winding rollers respectively when stopped after each cycle of operation or moving of the toweling to advance a clean section to wiping position thereby preventing undue wear on the friction surfaces on said rollers at any particular point as where one point on the roller F stops in confronting position to the pinch roller P or one point on the winding roller W stops in confronting position to the soiled towel roller S at each operation, increase in the useful life of the roller surfaces is insured. In the particular arrangement shown, a different surface will be presented to the pinch roller for every multiple of four operations before repeating and before the same point is again contacted thereby preventing undue wear on the friction surfaces, emery paper or sand paper of the friction or sand rollers constituted by the feeding and winding rollers and increasing the useful life of said roller surfaces a multiple of or approximately four times their ordinary life. The construction of the means for supporting and feeding the clean toweling as well as winding up the soiled toweling, the arrangement of the rollers and the manner in which the toweling is run through the machine as well as the construction of the rollers for feeding and winding up the toweling and the arrangement of the pinch roller P and the soiled towel roller S held under constant spring pressure against the respective feeding and winding rollers F and W respectively insures uniform, even and positive feeding and winding of the toweling as it moves down at the front and up at the back. This is also due to the fact that the soiled toweling roll is held in contact with the take-up or winding roll by spring tension instead of depending upon gravity as in most, if not all other machines, thus not only producing a more uniformly and tightly wound roll of soiled toweling but also reducing the space requirement of the roll. The pinch roll is also contained in an assembly or frame which serves as a toweling guide by reason of the opposite edges of the toweling strip feeding between the end plates 61 thereof and between the feeding roll and the guide plate 63 which is disposed in spaced concentric or parallel relation thereto. By having the pinch roll assembly separable from the rest of the mechanism, the pinch roll may be placed in position after the toweling has been mounted in position, thus making threading of the toweling between rollers I, P and F unnecessary. Placing of the toweling is also facilitated especially due to the fact that the separator or partition formed by the vertical wall 56 may be swung down away from the back of the machine when the end of the toweling is first wound upon the soiled towel roller S after being passed over and around the winding roller W and then fastened to or wound beyond the soiled towel roller S. By having the pinch roll pressing against the feeding roll under spring tension and positioned, or snapped in position under such tension over the feeding roller and under the clean towel roll so that the toweling is looped down between the idle roller I and the feeding roller F by the pinch roller P when in position as more particularly shown in Fig. 7 of the drawings, no towel slippage is required to set the pinch roller firmly. The toweling is maintained in constant uniform contact under pressure with a maximum surface or more than half the circumference of the feeding roller F as well as in engagement with the idling roller. This is also due to the engagement of the toweling with the winding roller W over more than one-half the circumference thereof and is further insured by the pressure between the toweling on the soiled towel roller S and the periphery of the winding roller W due to the resilient mounting of the soiled towel roller and the action of the springs 96 in maintaining the roller S and the soiled toweling wound thereon against the surface of the roller W by means of the spring held bearings 90. The separators 56 and 83 also maintain the clean toweling out of contact with the soiled toweling and the latter separator compensates for the varying sizes of the clean and soiled toweling rolls. By reason of the floating action thereof so that the separator 83 can assume any position required by the changing sizes and positions of the toweling rolls, a conservation of space is effected by utilizing the space given up by the diminishing clean roll to accommodate the increasing size of the soiled towel roll and when the clean towel roll is sufficiently small it may drop between the idle roller I and the vertical plate 56 on to the bottom 52 while still pressing against the idle roller I and increasing the surface contact with the latter until entirely unwound and paid out. At this time the bearings 90 may be depressed and the soiled towel roll displaced and removed by disengaging the trunnions 88 from the bearings 90 at the open recesses 89, when the machine is again in condition for reloading in the manner previously described. The spring 178 constituting an actuating means for the timing mechanism 171 not only actuates said mechanism but upon release of its operative connection with the timing mechanism or being operatively disconnected therefrom by disengagement of the roller 148 from the forked arm 177 acts to move the arm 146 and roller 148 to overcome the action of the spring 168 which otherwise normally holds the locking dog or pawl 166 engaged with the shoulder 153 of the cam or eccentric 151, by causing said roller to forcibly strike or engage the arm 167 and release the pawl 166 from its locking position holding or restraining the feeding of the clean toweling. The cam 151 will ride against and hold the pawl 166 out until again engaged by the shoulder or stop 153 while the cam 151 is turned by pulling out and feeding the toweling T. It should also be noted and will be apparent from the foregoing description of the construction and operation that due to the feeding and winding rollers being of the same diameter, and being operatively connected as described and directly controlling the feeding and winding of the toweling thereon, as well as the regulating and timing mechanism and intervals when the device is locked, and due to the means for preventing retrograde movement or unwinding of the soiled toweling roll, the soiled toweling will be rolled up into the cabinet in the form of a roller at a linear rate exactly equal to the linear rate at which the clean toweling is uniformly dispensed or pulled out according to the adjustment for which the machine is set but preferably approximately eight inches, thus keeping the amount or length of the depending loop of exposed toweling substantially constant. It will also appear that while the length of toweling dispensed at each use is preferably eight inches, this may be adjusted or varied as desired, as by varying the sizes of the feeding and winding rollers and the gear ratio of the driving means or gearing train, so that each successive length of toweling dispensed shall be and remain uniform once an adjustment is made. Also, the operating parts, device or feed roller and the toweling are locked against forward or reverse movement after each pulling of the towel and the toweling prevented from slipping when pulled unnaturally hard or in normal operation, thereby preventing rewinding of the used or soiled toweling on the clean toweling roll or unwinding the used or soiled toweling from the soiled toweling roll. Also, the time interval between feedings may be controlled by the time controlled mechanism which may be adjusted as desired, say from five to twenty-two seconds or otherwise. The time controlled mechanism as well as all the other mechanism, is not accessible to any one using the machine by reason of being enclosed in the cabinet in the manner described, thus preventing tampering therewith and rendering the device fool-proof.

It may also be stated that by having the damp used toweling pass upwardly against the lower tie rod 44 and the separator or plate 56 under angular stress at the top and bottom, the damp toweling is smoothed flat instead of leaving the same folded, rumpled or uneven and free to shrink. This is assisted by placing the toweling under pressure and tension of the depending loop and pulling thereon in dispensing of pulling the toweling out or down for and in use, and in being wound or taken up on the roller W and the roll S, as well as the frictional engagement and sliding against the rear lower truss rod 44 and the plate 56, whereby the toweling will be kept smooth and somewhat stretched out to normal condition or length and assisted in drying, so that the depending loop or length of toweling for use will be maintained in a loop of constant length, instead of shortening by drying in a crinkled, wrinkled, folded or uneven condition.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. A towel cabinet adapted to be mounted on a vertical support including a removably mounted frame, a cabinet thereover having a bottom opening, a back plate forming a partition in spaced relation to the vertical support at the back of the cabinet and having a forwardly extended bottom portion pivoted in the frame and whose forward edge is spaced from the front wall of the cabinet to form an opening for receiving the towel therethrough, towel feeding means at the front and lower portion of the frame, means to support a clean towel roll at the lower portion of the frame, said towel passing up in back of the partition, a winding means at the top and back portion of the frame and means actuating the winding means for winding the toweling as used above the clean towel roll and simultaneously and at the same rate with the feeding thereof.

2. In a towel cabinet, a feeding roll and a winding roll, a lower clean towel roll, an upper soiled towel roll and a floating separator between said clean towel roll and soiled towel roll including arms pivoted in the frame and a plate pivoted between the free ends of the arms.

3. In a towel cabinet, a feeding roll and a winding roll, a lower clean towel roll, an upper soiled towel roll and a pivoted floating separator between said clean towel roll and soiled towel roll, said separator comprising a plate resting on the clean towel roll and arms pivoted near the front of the cabinet, said plate being pivotally mounted in and between the rear ends of the arms.

4. In a towel cabinet, a frame having a bottom wall with a rear portion extending upwardly to form a partition, an idle roller upon which a clean towel supply is adapted to rest in conjunction with the partition, a friction feed roller in front of said idle roller for receiving the toweling thereover, a pinch roller assembly removably mounted in the frame over said feed roller and having towel guide means, said pinch roller being held toward the feed roller, an upper friction winding roller, the toweling extending upwardly in back of the partition and over the winding roller, upper bearings normally disposed toward the winding roller and a soiled towel roller held in said bearings and upon which the soiled towel is wound after passing over the winding roller and held against the winding roller.

5. A towel cabinet including a rigid section, a support in the section providing an opening at the front, said support extending along the bottom of the rigid section and upwardly in spaced relation to the back thereof, said support being pivoted at the bottom to tilt forwardly, means at the top of the support to hold the same in operative position and means including a receiving instrumentality whereby toweling may be fed from the support downwardly through the opening at the front then upwardly through said space to said instrumentality.

6. A towel cabinet including a housing having a back wall, a take-up means, dispensing means and a plate pivoted in the housing at the bottom and having a portion spaced from the back wall, means to hold the plate in the last named position in the housing, the front of the plate forming an opening with the housing through which the toweling from the dispensing means may pass downwardly and then upwardly between the back wall of the housing and the plate to the take-up means.

7. A towel cabinet including an outer section forming a housing, a stationary inner section, a take-up roll, dispensing means and an angular plate pivoted in the inner section at the bottom and having an upwardly extending portion, means to engage the top of the plate to frictionally hold the plate in operative position, the front of the plate forming an opening with the outer section through which the toweling from the dispensing means may pass downwardly and then upwardly at the back of the plate to the take-up roll.

EARL H. COOPER.